US005369284A

United States Patent [19]

Bellio

[11] Patent Number: 5,369,284

[45] Date of Patent: Nov. 29, 1994

[54] ACTIVE EDGE POSITION MEASURING DEVICE

[75] Inventor: Stephen L. Bellio, West Roxbury, Mass.

[73] Assignee: The Charles Stark Draper Laboratory, Inc., Cambridge, Mass.

[21] Appl. No.: 40,367

[22] Filed: Mar. 30, 1993

[51] Int. Cl.[5] .................... G01B 11/14

[52] U.S. Cl. .................... 250/561; 250/223 R; 356/375

[58] Field of Search ........ 356/375; 340/552, 555–557, 340/568, 674; 250/222.1, 223 R, 561; 359/629, 800, 205, 206, 710, 711

[56] References Cited

U.S. PATENT DOCUMENTS

| | | | |
|---|---|---|---|
| 2,472,380 | 6/1949 | Long | 88/14 |
| 2,502,503 | 4/1950 | Berkley | 88/14 |
| 3,214,596 | 10/1965 | Schwerdt, Jr. et al. | 250/239 |
| 3,500,063 | 3/1970 | Reno et al. | 250/217 |
| 3,601,613 | 8/1971 | Hock | 250/205 |
| 3,628,030 | 12/1971 | Fertig et al. | 250/219 S |
| 3,944,818 | 3/1976 | Bechtel | 340/556 |
| 4,021,031 | 5/1977 | Meihofer et al. | 226/20 |
| 4,097,751 | 6/1978 | Egan et al. | 250/571 |
| 4,355,895 | 10/1982 | Cairns et al. | 356/141 |
| 4,368,982 | 1/1983 | Van Arnam et al. | 356/445 |
| 4,523,801 | 6/1985 | Baba et al. | 359/205 |
| 4,859,062 | 8/1989 | Thurn et al. | 356/371 |
| 4,864,515 | 9/1989 | Deck | 364/516 |
| 5,054,926 | 10/1991 | Dabbs et al. | 356/345 |
| 5,057,280 | 10/1991 | Stock et al. | 422/83 |
| 5,092,675 | 3/1992 | Sommer | 356/338 |
| 5,095,386 | 3/1992 | Scheibengraber | 359/710 |

*Primary Examiner*—Robert P. Limanek
*Assistant Examiner*—David B. Hardy
*Attorney, Agent, or Firm*—Lappin & Kusmer

[57] ABSTRACT

A reflex proximity sensor includes a light emitting source which directs a beam by way of a beamsplitter toward a retroreflective surface, which reflects incident light back towards the source. A non-uniform (eccentric) convex lens is positioned in the beam path to produce a beam of light which is dispersed along a sensing axis, so that an eccentric cross-section beam is directed toward the retroreflective surface. The portion of the beam which reflects off the retroreflective surface passes back through the non-uniform convex lens and reflects off of the beamsplitter, and is directed to a photodetector. As an object traverses the beam in the direction of the sensing axis, the leading (or trailing) edge establishes a change in intensity level of the beam portion that reaches the detector. The output of the detector provides a signal representative of the edge position of the object.

8 Claims, 2 Drawing Sheets

ACTIVE EDGE POSITION MEASURING DEVICE

BACKGROUND OF THE INVENTION

The present invention relates to the field of measurement devices, and, more specifically, to measuring devices that are capable of determining or actively sensing the edge position of an object with respect to a selected field of view.

Determining the position of an object is a common requirement in various industries, for example, to monitor products during the fabrication process. Many products today, although mass produced, are intricately designed, thus requiring precise cutting and machining of the product during the various stages of production. Moreover, increasing automation of modern manufacturing plants demands instrumentation and control systems that are able to determine the position of the product at the various stages of production in a fast and accurate manner.

Prior art edge position measuring devices include position detectors which illuminate an object as it passes, and detect scattered light using a linear diode array. The prior art also includes obstruction detectors which use a scanning laser in conjunction with a retroreflective surface and, an optical detector, and includes imaging systems that apply an image onto a multi-element ccd sensor. However, the foregoing devices usually require associated circuitry that is relatively complex. Accordingly, such edge position measuring devices are costly. Moreover, such devices are often incapable of generating sufficient gray-scale contrast between the edge of the object being monitored and the background, or because they are characterized by an inherently low signal to noise ratio, ultimately affecting the system's ability to accurately determine the position of the object being monitored.

In one prior art form, a so-called reflex proximity sensor uses a light emitting source which directs a beam toward a retroreflective surface, which reflects incident light back towards the source. A collimating lens is positioned in the beam path to produce a collimated beam of light. The portion of the beam which reflects off the retroreflective surface passes back through the collimating lens, and generally irradiates a circular region on a photodetector. A beamsplitter is used to direct the return beam to the detector. The position and size of the optical components are selected so that a desired spot size is established at the detector. As the object being monitored traverses the beam, between the collimating lens and the retroreflective surface, the leading (or trailing) edge establishes a change in intensity level of the beam portion that reaches the detector. The output of the detector provides a signal representative of the passage of the leading (or trailing) edge. However, even these systems provide less than desired performances. Particularly, the circular cross-section of the beam often provides unacceptable resolution limits and sensitivity along the detection axis.

As the above-described and other prior art position measuring devices have proven less than optimal, an object of this invention is to provide an improved edge position measuring system.

Another object of the invention is to provide an edge position measuring system that evinces a fast system response time.

Still another object of the invention is to produce a relatively low cost apparatus that employs simple system electronics.

Yet another object of the invention is to provide a position measuring device which may be readily integrated with pre-existing assembly line equipment.

Other general and more specific objects of this invention will in part be obvious and evident from the drawings and description which follow.

SUMMARY OF THE INVENTION

These and other objects are attained by the invention which provides, in one aspect, an active edge position measuring system, for example, useful in measuring the position of an article during the fabrication process. In one form, the edge position measuring system of the present invention comprises an optical source, a beamsplitter, a convex lens, a retroreflective surface, and a photodetector. The optical source generates an optical beam along an optical axis. The beamsplitter has a first input axis and a second input axis extending into and from opposite sides thereof. The first and second input axes are substantially parallel to the optical axis. The beamsplitter further comprises an output axis that is angularly offset with respect to and coplanar with the second input axis. The beamsplitter is positioned along the optical axis so as to receive along its first input axis the optical beam from the optical source. The beamsplitter allows a portion of the optical beam incident thereon to pass therethrough, and away from the beamsplitter along the second input axis.

The convex lens is positioned along the second input axis to receive light from the beamsplitter as that light propagates along the second input axis. The lens has a first face and a second face, both transverse to the second input axis. The second face has a first radius of curvature measured with respect to a first axis perpendicular to the second input axis, and a second radius of curvature measured with respect to a second axis perpendicular to the second input axis, where the first and second axes are mutually perpendicular and intersect the second input axis at a common point. The first radius of curvature is smaller than the second radius of curvature. Moreover, the first axis is perpendicular to the plane containing the second input axis and the output axis. In the preferred form of the invention, the convex lens is a plano/cylindrical lens, i.e. the first face is planar and the second face is cylindrical (about an axis parallel to the first axis).

The retroreflective surface is positioned along the second input axis and extends transverse to that axis. The surface receives light passing from the second face of the convex lens, and reflects the received light back to that second face. That received light is passed through the convex lens and along the second input axis to the beamsplitter. At the beamsplitter, the light incident thereon passes along the second input axis through the beamsplitter, with at least a portion of that light propagating from the beamsplitter along the output axis.

The photodetector is positioned along the output axis and receives light passing from the beamsplitter along the output axis, and generates a signal representative thereof.

With this configuration, the light beam that passes from the convex lens to the retroreflective surface is dispersed non-uniformly, so that maximum dispersion is in the direction of the second axis. That light is reflected back to the convex lens by the retroreflective surface substantially along the same propagation axes. As an object to be monitored translates through the beam in the direction of the second axis, a portion of the beam is intercepted, thereby decreasing the intensity of light at the detector. The second axis is the most sensitive of all directions due to the preferential dispersion established by the non-uniform convex lens. This improved sensitivity provides substantial improvement of detecting the translation of the leading (and trailing) edge of the object to be monitored in the direction of the second axis.

In various forms of the invention, the position measuring system may also include a transport assembly for transporting one or more articles between the retroreflective surface and the convex lens along a transport axis. Preferably, the transport axis is angularly offset from and intersects with the second input axis. For maximum sensitivity, the transport axis is substantially parallel to the second axis. The system can further comprise a collimating lens positioned along the second input axis between the beamsplitter and the convex lens.

In yet other forms of the invention, the invention may be used as an analog proximity sensor. In this form, the position detection system (for example, including the light source, beamsplitter, optical detector, and non-uniform convex lens) may be fixedly positioned with the optical beam path adjacent to the second face of the convex lens extending along a detection axis. With this configuration, an object bearing a retroreflective surface may be translated toward (or away from) the system along an axis that intersects that beam path (preferably along the detecting axis, such that the retroreflective surface passes through the beam path). As the object moves along its translational axis, the retroreflective surface returns to the system a varying amount of light, depending on its position along the translational axis, the beam shape, and the area of the retroreflective surface. However, by arranging the system relative to the translational axis of the object so that the detection axis and translational axis lie in a plane parallel to the plane of the first axis of the first face of the non-uniform convex lens and the second input axis, the system has maximum sensitivity, due to the non-uniformity of the convex lens. As a result, high sensitivity proximity measurements may be made from the object relative to the positioning measuring system.

Further aspects of the invention may be determined from the above summary and from the description which follows.

BRIEF DESCRIPTION OF THE DRAWINGS

For a fuller understanding of the features, advantages, and objects of the invention, reference should be made to the following detailed description and the accompanying drawings, in which.

DESCRIPTION OF THE PREFERRED EMBODIMENT

Figure 1:
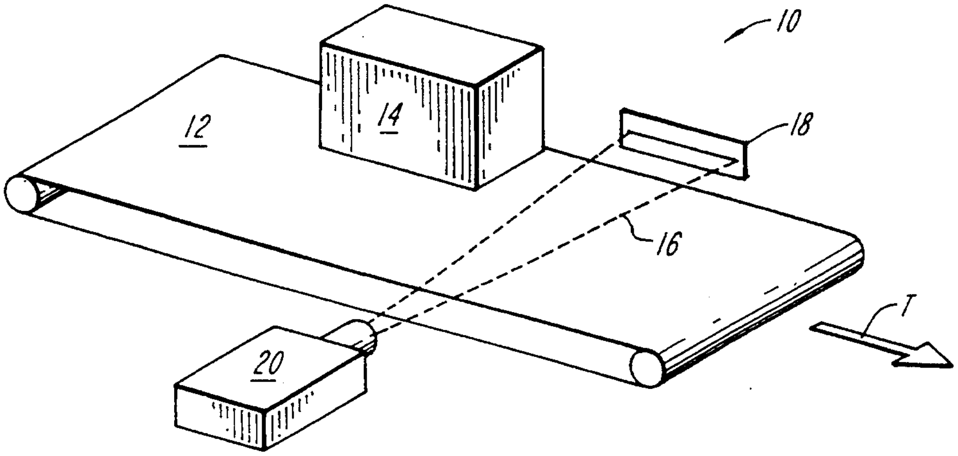
FIG. 1 is a perspective view of an apparatus for detecting the edge position of an object.

An edge position measuring system 10 embodying the invention is shown in FIG. 1. The system 10 includes a transport assembly 12, a retroreflective surface 18, and an optical assembly 20. The transport assembly 12 is adapted to carry or convey an object 14 along a transport axis T. The retroreflective surface 18 is disposed on one side of the transport assembly. In the illustrated embodiment, the surface 18 is elongated in the direction of the axis T and faces toward the transport assembly 12.

The optical assembly 20 is positioned on the side of transport assembly 12 opposite to the surface 18. As described in detail below, the optical assembly 20 directs a diverging (in the direction of the axis T) beam 16 toward surface 18 and receives light reflected back from surface 18. Since surface 18 is retroreflecting, the return beam converges as it returns to assembly 20.

In operation, the transport assembly 12 moves an object 14 along the transport axis T. As the object 14 translates between the retroreflective surface 18 and the optical assembly 20, the object 14 interferes with the light beam 16. This interference results in less return light being incident on optical assembly 20. The assembly 20 senses this decrease in the amount of reflected light and generates a signal representative thereof.

Figure 2:
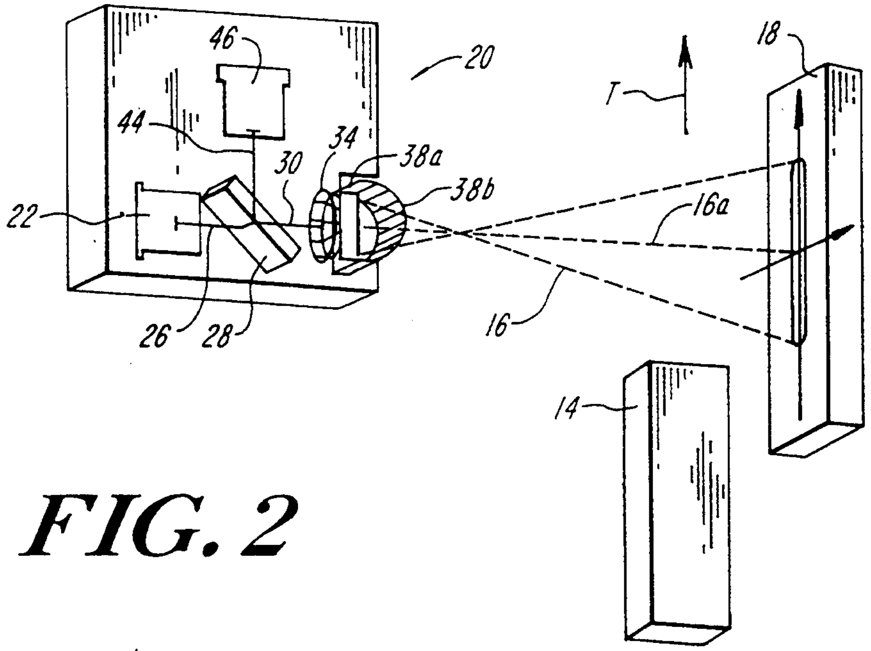
FIG. 2 depicts a diagrammatic top view of an edge position measuring system according to a preferred embodiment of the invention.

The optical assembly 20 includes an optical source, a photodetector, and optical elements. Referring to FIG. 2, the device 20 includes an optical source 22 a beamsplitter 28, a collimating lens 34 and an eccentric (i.e. non-uniform) convex lens 38. The optical source 22 generates an optical beam of light along an optical axis. The beamsplitter 28 is positioned so as to receive the optical beam. The beam generated by the optical source 22 passes through the beamsplitter 28 and propagates to and through the collimating lens 34 to the non-uniform lens 38. The optical beam passing through the non-uniform lens 38 is spread preferentially in the direction parallel to the axis T. That spreading beam 16 is directed toward the retroreflective surface 18. Light incident upon the retroreflective surface is reflected back in the direction opposite to its forward (i.e. toward surface 18) direction of propagation. The reflected light passes through the lens 38 and collimating lens 34 to the beamsplitter 28. The beamsplitter 28 then passes a portion of the reflected light along an output axis to a photodetector 46 that is further included in the assembly 20. The present system need not include a discrete collimating lens to produce the collimated beam of light. Rather, the system can operate with just the non-uniform lens 38 to produce an illumination field in conjunction with the optical source.

In the preferred embodiment, optical source 22 is a light emitting diode, although other types of optical beam generators may be used.

The beamsplitter 28 is positioned to receive light from the optical source 22 along a first input axis 26, and pass light along a second input axis 30, the second axis 30 being substantially parallel to the first axis 26. A portion of light reflected back to the beamsplitter 28 along the second input axis 30 from the retroreflective surface 18, passes away from the beamsplitter 28 along the output axis 44 to the photodetector 46. The beamsplitter can be of conventional construction and design. The output axis 44 of the beamsplitter is angularly offset from axis 30 by ninety degrees, although in other embodiments, different offsets may be used.

A portion of the light beam generated by the optical source 22 passes through the beamsplitter 28 and is collimated by a lens 34 before passing through the eccentric convex lens 38. The eccentric convex lens 38 converges the collimated beam received from the collimating lens 34 to form an eccentric field of illumination. The lens 34 may be placed at various positions along axis 30, resulting in correspondingly varied spot size at reflector 18. Alternatively, the system 20 may be configured without lens 34.

According to the preferred embodiment, the lens 38 is a plano-convex lens with a planar first face (or lens surface) 38*a* and a cylindrical second face (or lens surface) 38*b*. In general, however, the lens 38 is eccentric with its second face having a relatively small radius of curvature about a first (or focal) axis (which is perpendicular to the plane defined by axes 30 and 44) and a relatively large radius of curvature about a second axis (which is parallel to the plane defined by axes 30 and 44). The eccentric lens 38 preferentially disperses the collimated beam and creates a substantially elliptical illumination field, preferably on the retroreflective surface 18.

The light passing from the non-uniform convex lens 38 is normally incident upon the retroreflective surface 18. The retroreflective surface 18 is typically made of readily available retroreflective tape, but may take other conventional forms as well. Moreover, the retroreflective surface can be angularly offset with respect to the axis 16*a*, but is preferably disposed transverse thereto.

The retroreflective surface 18 reflects light incident thereon back towards the lens 38 substantially along the same propagation axes. That reflected light passes through lens 38 and the collimating lens 34, and along the second input axis 30.

The beamsplitter 28 passes a selected portion of the reflected light received along the second input axis 30, away from the beamsplitter 28 along the output axis 44. The photodetector 46 is positioned along the output axis 44 to receive the reflected light from the beamsplitter 28. The photodetector 46 generates a signal indicative of the amount of received light. The photodetector 46 can be any commercially available apparatus that generates a signal in response to the intensity light incident thereon. In operation with the present system, the photodetector provides a voltage that varies substantially with the incident light.

In the arrangement of the reflex nature of the system 20 illustrated in FIG. 2, the photodetector 46 optically appears to be occupying the same space as the optical source 22. This configuration allows use of retrospective material with narrow angle sensitivity, yielding high signal-to-noise ratios.

Figure 3:
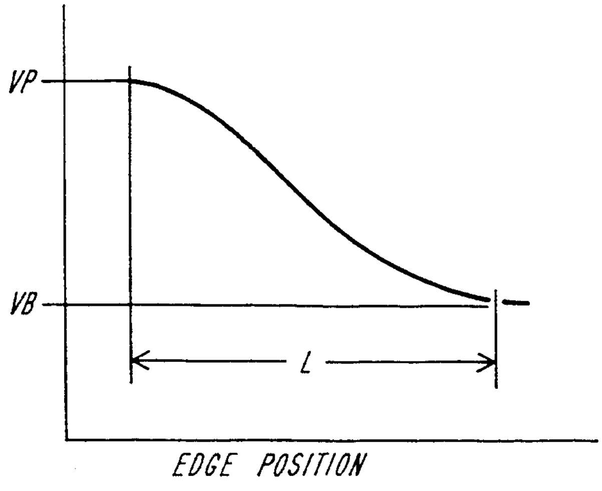
FIG. 3 shows the output of the position measuring system as the edge of an object translates across the fields of view of the system of FIGS. 1 and 2.

FIG. 3 illustrates a graph of the output voltage of the signal generated by the photodetector 46, prior to and during the constant velocity translation of the leading edge of object 14 along axis T across the field of view of beam 16. The maximum amount of light detected by the photodetector 46 along the output axis 44 corresponds to the voltage level VP. This voltage level indicates that the object 14 has not entered the illumination field. As the edge of the object 14 enters the field of illumination incident on retroreflective surface 18, there is a drop in voltage corresponding to the decreased amount of light reflected back to the photodetector 46 by the retroreflective surface 18. As the object 14 continues to translate along axis T, the corresponding voltage level continues to decrease until it reaches a base amount VB, indicating maximum blockage of the beam 16. Once the object fully translates across the reflecting surface, the light level received at the photodetector 46 returns to its original level, thereby increasing the voltage level to the original peak value VP. Thus, a decrease in the voltage level measured by the photodetector 46 indicates that the edge of the article 14 has translated into the illumination field. With the illustrated configuration, exemplified by the output of FIG. 3, the response is substantially linear over the middle two-thirds of the transit of the leading edge. While the system 10 is optimized for detection of edge motion along axis T, the system will also detect edge motion along other axes. However, the angle of eccentricity of lens 38 is matched to the T-axis, and any other angle will result in reduced sensitivity to motion.

Figure 4:
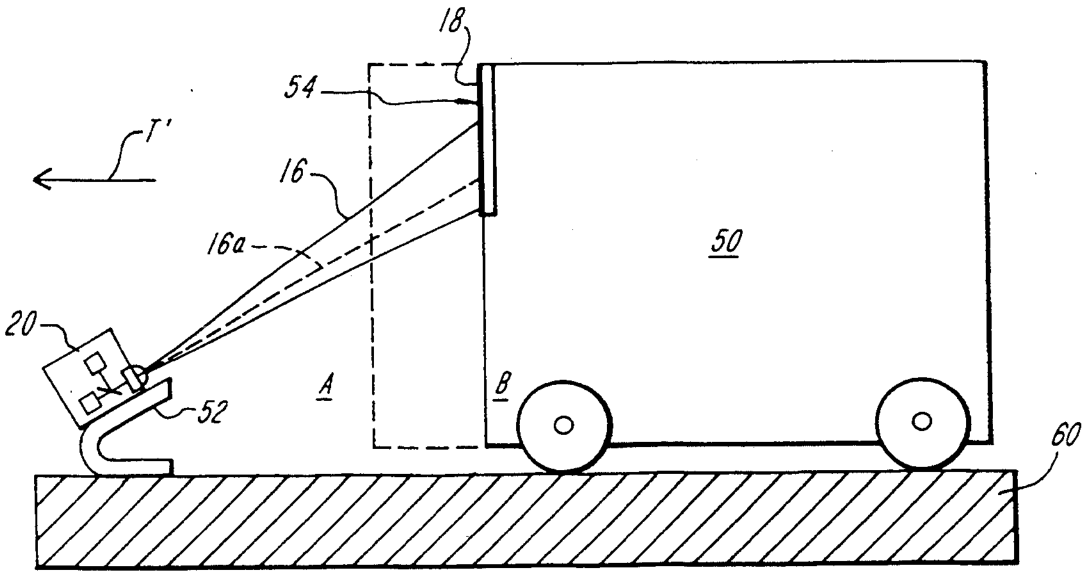
FIG. 4 shows an embodiment of the invention adapted for me ring the distance of an object relative to a reference point.

In an alternate embodiment, the position measuring system 20 can be used to measure the position or distance of an object 50 relative to a fixed point (such as the location of system 20). The object 50 has a retroreflective region on at least one surface 54. Referring to FIG. 4, the system 20 can be supported by a stanchion or inclined surface 52. A layer of retroreflective tape 54 adheres to a selected portion of an object that may be moved along an axis T′ that preferably intersects axis 16*a*.

The system 20 generates a beam of light 16 along axis 16*a*. As the object 50 moves so that the retroreflective surface 54 faces system 20, that surface 54 moves so that it enters the field of view of beam 16. For example, when the object 50 is located at position A, the retroreflective surface 54 is not disposed along the path of the light beam 16. With the object 50 placed in this position, a nominal amount of light is reflected back to the system 20. If the object 50 is moved so that it translates across the beam 16 to position B, the retroreflective surface 54 moves into the path of the light beam 16. The amount of light received by the system 20 increases because of the reflective properties of the surface 54. This increase in light corresponds to an increase in the amount of reflected light received by the photodetector 46 (see FIG. 2), which in turn is proportional to the area of the retroreflective surface within the beam boundaries. The photodetector 46 generates a signal indicative of the intensity of reflected light received back from surface 54. This signal is used to accurately determine the distance traveled by the object 50.

The various elements of the system 10 can be formed of materials which are generally known to those of ordinary skill in the art. Accordingly, the above description attains the objects set forth.

The invention can be embodied in other specific forms without departing from the spirit or essential characteristics thereof. The described embodiments of the invention are to be considered in all respects as illustrative and not restrictive, the scope of the invention being indicated by the appended claims rather than the foregoing description, and all changes which come within the meaning and range of equivalency of the claims are therefore intended to be embraced therein.

What is claimed is:

1. A position detecting system comprising:

A. an optical source including means for generating an optical beam along an optical axis, B. a beamsplitter having a first input axis and a second input axis extending into and from opposite sides thereof, and having an output axis, said first input axis and said second input axis being substantially parallel to said optical axis, and said output axis being angularly offset with respect to and substantially coplanar with said second input axis, and said beamsplitter being positioned to receive said optical beam along said first input axis and adapted:

i. to pass at least a portion of light incident thereon along said first input axis through said beamsplitter and away from said beamsplitter along said second input axis, and ii. to pass at least a portion of light incident thereon along said second input axis away from said beamsplitter along said output axis, C. convex lens positioned along said second input axis and having a first face transverse to said second input axis and positioned to face said beamsplitter and receive light passing from said beamsplitter along said second input axis, and having a convex second face transverse to said second input axis, said second face having a first radius of curvature measured with respect to a first axis perpendicular to said second input axis, and having a second radius of curvature measured with respect to a second axis perpendicular to said second input axis, said first and second axes being mutually perpendicular and intersecting said second input axis at a common point, and said first axis being substantially perpendicular to a plane of said second input axis and said output axis, and said first radius of curvature being smaller than said second radius of curvature, D. a retroreflector surface positioned along said second input axis and extending transverse thereto and being positioned to receive light passing from said convex face and to reflect said received light back to said convex face, and E. a photodetector positioned along said output axis including means for receiving light passing from said beamsplitter along said output axis and for generating a signal representative thereof.

2. The system according to claim 1 wherein said second radius of curvature is infinite.

3. The system according to claim 1 further comprising a transport assembly including means for transporting one or more articles between said retroreflector and said beamsplitter along a transport axis, said transport axis being angularly offset from and intersecting with said second input axis.

4. The system according to claim 1 further comprising a collimating lens positioned along said second input axis between said beamsplitter and said convex lens.

5. An optical position detecting system comprising:

A. an optical source for generating an optical beam along a first axis,

B. a convex lens assembly having a first lens surface transverse to a first lens axis and a second lens surface transverse to a second lens axis, said first and second lens axes being coaxial, wherein said second lens surface has a principal radius of curvature measured with respect to a focal axis perpendicular to and has a point of intersection with said first and second lens axes, said radius of curvature being a minimum compared with corresponding radii of curvature measured with respect to all other axes perpendicular to and intersecting said first and second lens axes at said point, C. a beamsplitter positioned to receive said optical beam and pass at least a portion of said beam along said first lens axis to said lens assembly, and to receive light from said first lens surface and pass at least a portion of said light along an output axis extending from said beamsplitter, said output axis being angularly offset with respect to said first lens axis and being in a plane perpendicular to a plane containing said second lens axis and said focal axis, and D. a photodetector including means positioned substantially for receiving said light passed along said output axis and for generating a position signal representative of the intensity of said received light.

6. A system according to claim 5, further comprising:

E. a retroreflective surface facing said second lens surface along said second lens axis, said surface being substantially in a focal plane of said convex lens assembly for said principal radius of curvature.

7. A system according to claim 5, further comprising:

E. a retroreflective surface adapted to be positioned on an object.

8. A system according to claim 7 further comprising:

F. positioning means for moving said object whereby said retroreflective surface faces said second lens surface and intercepts light propagating from said second lens surface.

* * * * *